(12) United States Patent
Meller

(10) Patent No.: US 7,146,918 B2
(45) Date of Patent: Dec. 12, 2006

(54) WIND-POWERED LINEAR MOTION HYDROGEN PRODUCTION SYSTEMS

(76) Inventor: Moshe Meller, 306 E. BayRoc Cable Beach-P.O. Box CB-13043, Nassau (BS)

( * ) Notice: Subject to any disclaimer, the term of this patent is extended or adjusted under 35 U.S.C. 154(b) by 226 days.

(21) Appl. No.: 10/898,089

(22) Filed: Jul. 21, 2004

(65) Prior Publication Data

US 2005/0252764 A1    Nov. 17, 2005

Related U.S. Application Data

(60) Provisional application No. 60/576,190, filed on Jun. 1, 2004, provisional application No. 60/575,304, filed on May 28, 2004, provisional application No. 60/572,259, filed on May 17, 2004.

(51) Int. Cl.
*B63H 9/04* (2006.01)
*F03B 13/10* (2006.01)
*B63B 21/62* (2006.01)

(52) U.S. Cl. ............... 114/39.26; 114/242; 114/382; 290/254

(58) Field of Classification Search ............... 440/8, 440/9, 33; 114/102.1, 39.21, 39.26, 39.29, 114/242, 246, 249, 382; 290/42–44, 53–55
See application file for complete search history.

(56) References Cited

U.S. PATENT DOCUMENTS

| | | | |
|---|---|---|---|
| 2,911,541 A | 11/1959 | Neufville et al. | |
| 3,238,911 A | 3/1966 | Pazulski | |
| 3,895,236 A | 7/1975 | Herron | |
| 4,058,979 A | 11/1977 | Germain | |
| 4,159,427 A | 6/1979 | Wiedemann | |
| 4,274,010 A | 6/1981 | Lawson-Tancred | |
| 4,316,361 A | 2/1982 | Hoar | |
| 4,335,093 A * | 6/1982 | Salomon | 423/644 |
| 4,494,008 A | 1/1985 | Patton | |
| 4,495,424 A | 1/1985 | Jost | |
| 4,546,264 A | 10/1985 | Pinson | |
| 4,589,344 A | 5/1986 | Davison | |
| 4,993,348 A * | 2/1991 | Wald | 114/265 |
| 5,027,735 A * | 7/1991 | Labrador | 114/39.26 |
| 5,758,911 A | 6/1998 | Gerhardt | |
| 6,508,191 B1 | 1/2003 | Spoljaric | |
| 6,918,350 B1 * | 7/2005 | Morse | 114/382 |
| 2002/0182946 A1 * | 12/2002 | Tanaka | 440/6 |
| 2003/0168864 A1 | 9/2003 | Heronemus et al. | |
| 2004/0080166 A1 | 4/2004 | Davidson | |

FOREIGN PATENT DOCUMENTS

CA      2328654 A1 *    6/2002

(Continued)

OTHER PUBLICATIONS

Hydrogen Society on the Island of Utsira; May 9, 2003 article from the Internet.

*Primary Examiner*—Ajay Vasudeva
(74) *Attorney, Agent, or Firm*—Frishauf, Holtz, Goodman & Chick, P.C.

(57) ABSTRACT

A system for generating hydrogen is provided which includes at least one vessel which floats in water. At least one sail for capturing wind to move the vessel reciprocally along a substantially linear path is mounted on the vessel. A power generation system is provided for converting movement of the vessel relative to the water into electricity. And an onboard hydrogen production system produces hydrogen by electrolysis using the electricity generated by the power generation system.

3 Claims, 8 Drawing Sheets

FOREIGN PATENT DOCUMENTS

| | | | |
|---|---|---|---|
| DE | 42 34 649 A1 | 7/1993 | |
| GB | 2383978 A * | 7/2003 | |
| GB | 2405742 A * | 3/2005 | |
| JP | 05236698 A * | 9/1993 | |

* cited by examiner

WIND-POWERED LINEAR MOTION HYDROGEN PRODUCTION SYSTEMS

CROSS-REFERENCE TO RELATED APPLICATIONS

This application claims the benefit under 35 U.S.C. §119 (e) of U.S. provisional patent applications Ser. No. 60/572,259 filed May 17, 2004, Ser. No. 60/575,304 filed May 28, 2004 and Ser. No. 60/576,190 filed Jun. 1, 2004.

FIELD OF THE INVENTION

The present invention relates to a system of producing hydrogen by converting wind power into electricity for use in producing hydrogen via sail-driven vessels.

BACKGROUND OF THE INVENTION

The world's current reliance on fossil fuels poses many problems. Fossil fuels are currently consumed 100,000 times faster than they are made, sparking speculation as to how much longer the world's fossil fuel supplies will last. In addition, fossil fuel use poses environmental risks in drilling to retrieve the fuel, transporting the fuel to consumers, and through the by-products of fossil fuel consumption. Still further, two thirds of the world's oil is concentrated in the Middle East, in the control of OPEC, forcing nations to rely in large part on OPEC to ensure their supply of oil.

By contrast, hydrogen powered fuel cells offer many advantages over fossil fuels. For example, hydrogen has a simply chemistry and produces energy cleanly. In addition, hydrogen-powered fuel cells can convert 40–65% of the hydrogen's energy, which makes fuel cells much more efficient than internal combustion engines, which capture only 15–20% of the energy of gasoline.

Hydrogen is also an environmentally sounder fuel source. For example, hydrogen is odorless, colorless, and tasteless, and is both non-toxic and safe to breathe. Because hydrogen dissipates when leaked, a major hydrogen spill would amount to little more than a waste of valuable fuel. Thus, in contrast to the ecological disasters caused by oil spills, spilled hydrogen merely dissipates.

Hydrogen also offers economic advantages as a replacement to fossil fuels. Since hydrogen is formed from the electrolysis of water, it exists in unlimited supply. In addition, increased use of hydrogen-powered fuel cells will reduce world dependence on conventional fuels, which are subject to volatility in price and supply. By substituting hydrogen for fossil fuels, moreover, industrialized nations can reduce their heavy dependence on OPEC to supply oil.

Fuel cells are already being used to generate power for clusters of homes and factories, and are likely to appear soon in portable applications such as laptop computers, cellular phones and cars. Indeed, many major automobile manufacturers are investigating fuel cell technology; hydrogen-powered buses are already in use in Vancouver, Stuttgart, Chicago and Sacramento; and the state of California has mandated that 10% of new cars meet a "zero emissions" by 2008.

Attempts have been made to extract hydrogen for fuel cells from petrol or methanol. However, this method of hydrogen extraction adds considerable weight and complexity to cars, and yet still produces some tail-pipe emissions. Therefore, this approach has largely been abandoned. As an alternative solution, oil firms and automobile manufacturers now hope feed to fuel cells directly with hydrogen by connecting filling stations to natural gas grids. Reformer plants would extract hydrogen from the hydrocarbon gas at the filling station, thereby allowing the fuel cell to be directly filled with hydrogen.

Wind power, however, is a reliable, clean, low cost, and unlimited source of energy for the production of hydrogen. In addition, by producing hydrogen from wind power, the energy produced by wind can be stored. In this regard, a project is being undertaken on the island of Utsira on the Norwegian coast to use excess energy from windmills to produce hydrogen (see Hydrogen Society on the Island of Utsira, Norsk Hydro, May 9, 2003). When wind power is unavailable for generating electricity, the hydrogen is fed to a generator to produce electricity. Thus, it is clear that wind power will be one of the major sources of energy for high volume hydrogen production.

Currently the two major wind energy alternatives are onshore and offshore wind parks or wind farms. However, both types of wind parks suffer several disadvantages. For example, the windmills are fixed to the ground, whether onshore or offshore, and must therefore survive extreme weather conditions. In addition, in order to produce energy from wind cost-effectively, the windmills must have very large blade spans. Therefore, the main shaft of the windmill rotates slowly, and efficiency at the central area of the windmill is low. However, power generators require a relatively high rate of rotation to function efficiently. As a result, a gear mechanism must be provided between the main shaft of the windmill and the generator. Still further, wind speeds over land are low relative to wind speeds over water. However, offshore wind parks are currently limited to shallow water, thereby restricting possible locations.

OBJECT OF THE INVENTION

It is an object of the invention to provide a system for efficiently harnessing wind power to produce hydrogen.

SUMMARY OF THE INVENTION

According to one embodiment of the present invention, a system for generating hydrogen is provided which includes at least one vessel which floats in water, wherein each vessel comprises: at least one sail for capturing wind to move the vessel reciprocally along a substantially linear path; a power generation system for converting movement of the vessel relative to the water into electricity; and an onboard hydrogen production system to produce hydrogen using the electricity generated by the power generation system.

DETAILED DESCRIPTION

Figure 1:
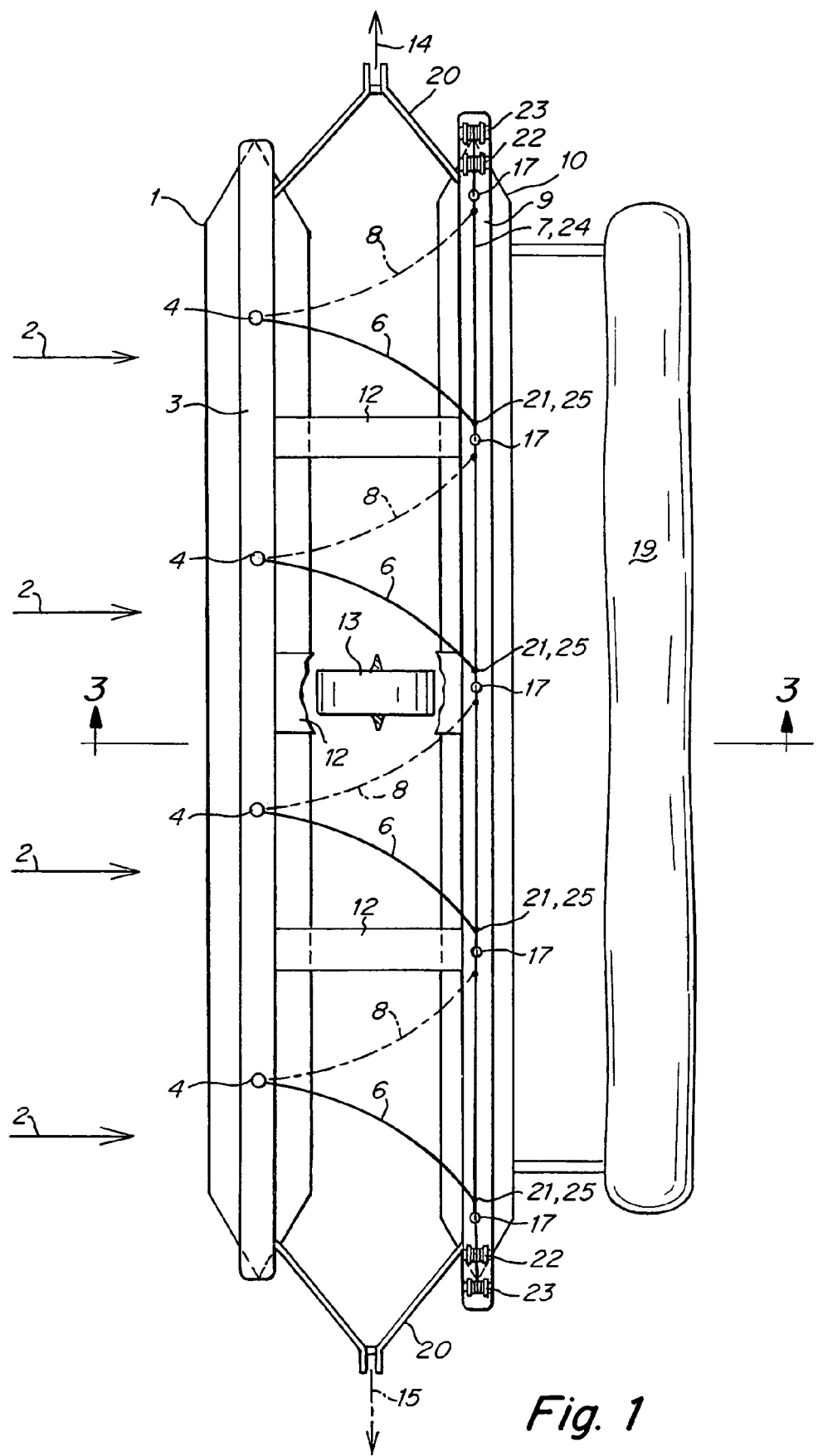
FIG. 1 is an overhead view of a vessel according to the present invention.
Figure 2:
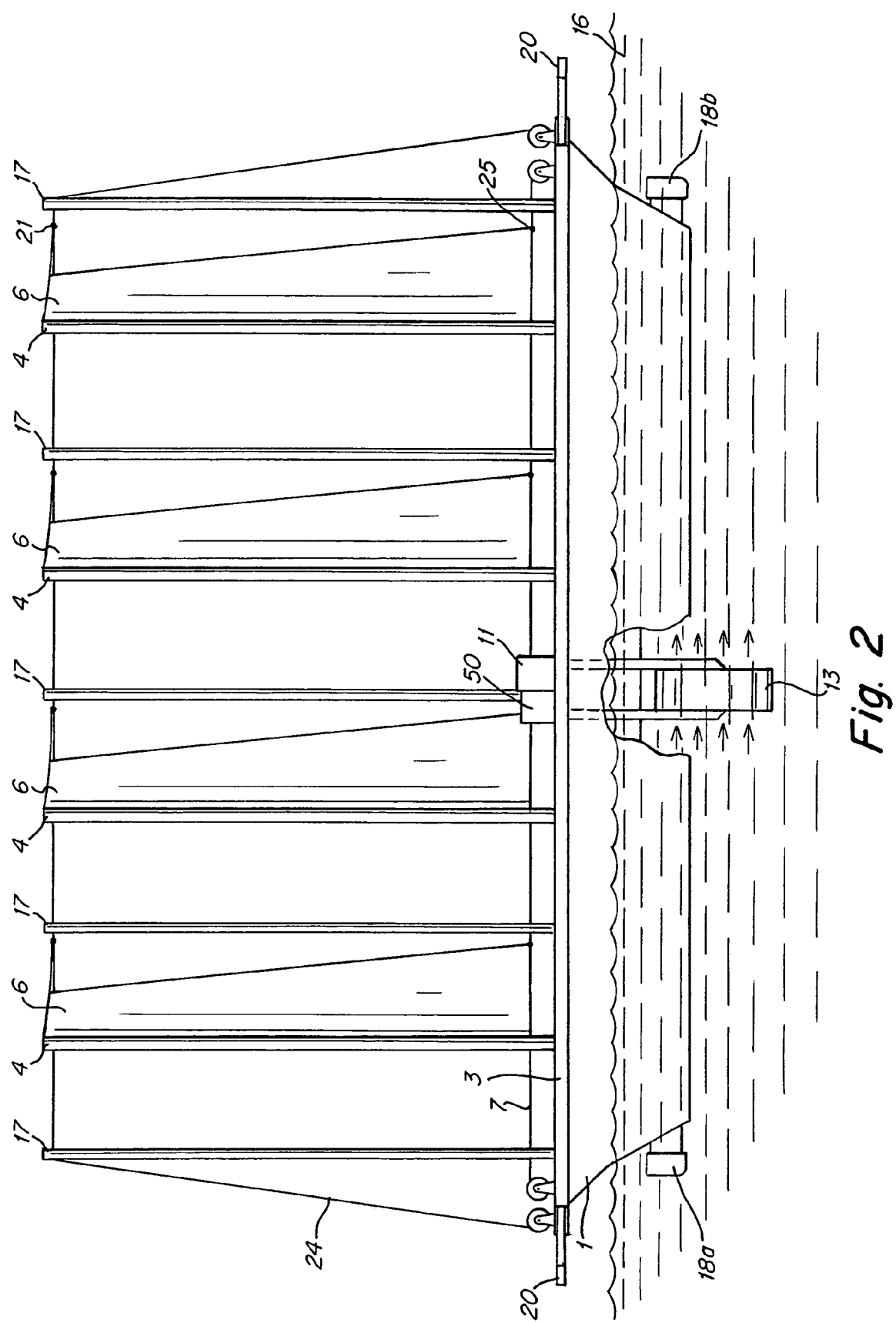
FIG. 2 is a side view of the vessel according to the present invention.
Figure 3:
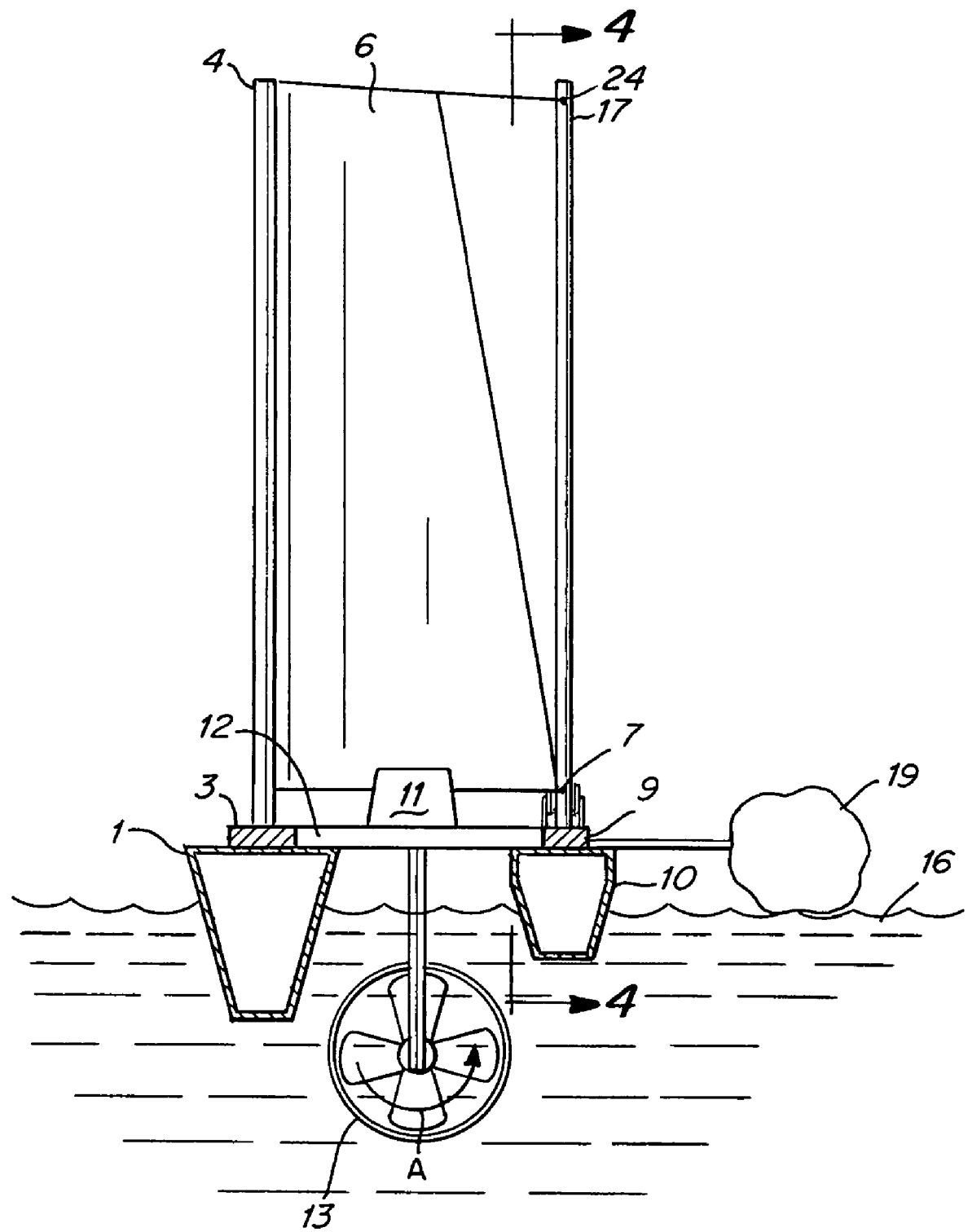
FIG. 3 is a view along line 3—3 in FIG. 1.

FIGS. 1–6 show a system for generating hydrogen according to a first embodiment of the present invention. Primary floating element 1 and secondary floating element 10, which are, for example, pontoons or the like, are connected by connectors 12 and support the vessel so as to allow it to float in a body of water 16. A plurality of sails 6 are mounted on the vessel via poles 4, which are supported by supporting element 3 mounted on the primary floating element 1. The sails 6 may, for example, be made from either flexible or rigid sail materials, and the poles may, for example, be constructed as rigid poles or as vertical cables. Wind blowing in direction 2 is caught by the sails 6 to drive the vessel in direction 14. The direction of the vessel may be controlled via rudder 18b (See FIG. 2). The vessel moves in direction 14 along a path that is substantially linear and substantially perpendicular to the wind direction 2. The motion of the vessel relative to the water creates a flow of water through turbine 13, as shown in FIG. 2. The flow of water through the turbine 13 causes the turbine 13 to rotate, as shown by the arrow A in FIG. 3. The rotation of the turbine 13 is transmitted through a gear mechanism to a generator 11 (not shown in FIG. 1) to increase the RPM of the generator 11, which generates electricity. The electricity generated by the generator 11 is converted to DC (or a DC generator is used) and the DC electrical power is used to produce hydrogen from water by electrolysis in an electrolysis-type hydrogen generator 50 (See FIG. 2). The water used by the hydrogen generator 50 is pumped into the hydrogen generator 50 from the water in which the vessel is floating. In order to optimize the purity of the water supplied to the hydrogen generator 50, the water may be filtered by reverse osmosis filters before the water is used to produce hydrogen. The single turbine 13 may, moreover, be replaced with a plurality of turbines.

Figure 6:
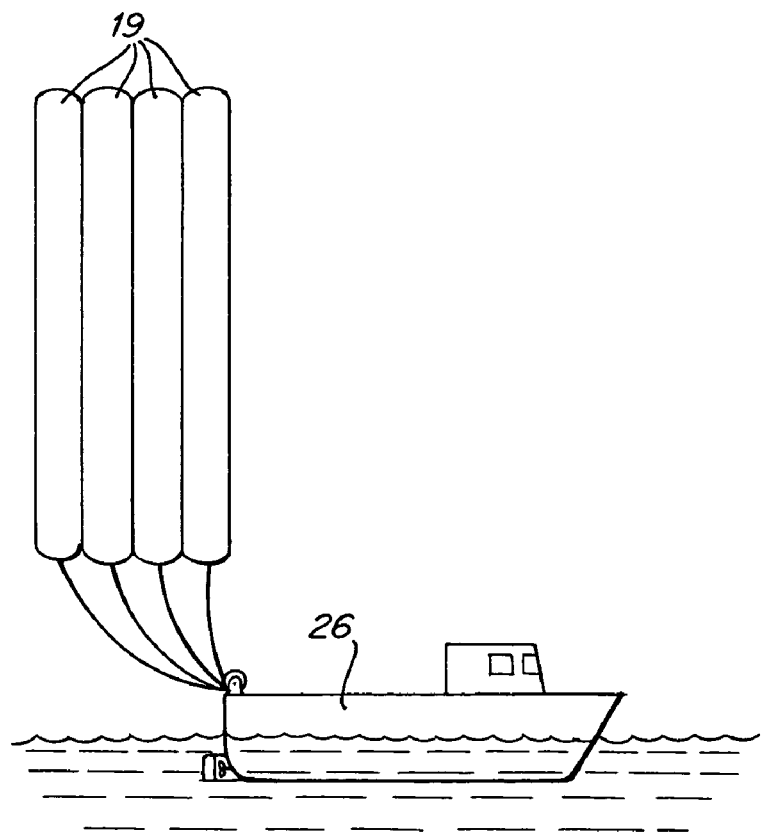
FIG. 6 shows a vessel for collecting hydrogen containers according to the present invention.

The hydrogen is then stored in inflatable container 19, which extends alongside the vessel for most of the length of the vessel. The container 19 is preferably buoyant. The container 19 is connected to the hydrogen generator 50 by a flexible hose and quick-connect, and is detachable and replaceable while the vessel is in motion, so as to allow fully inflated containers 19 to be collected by, for example, a motorboat as shown in FIG. 6, and replaced. The inflatable containers 19 thereby allow easy collection and transport of the produced hydrogen. During the lag time between when a first container 19 is detached and when a second container 19 is attached to the vessel to replace the detached container, a fixed hydrogen storage container on the vessel may be used to collect hydrogen, to prevent any loss. The inflated containers 19 are lighter than air, which allows them to be easily transported by sea or air to a desired destination.

Figure 4:
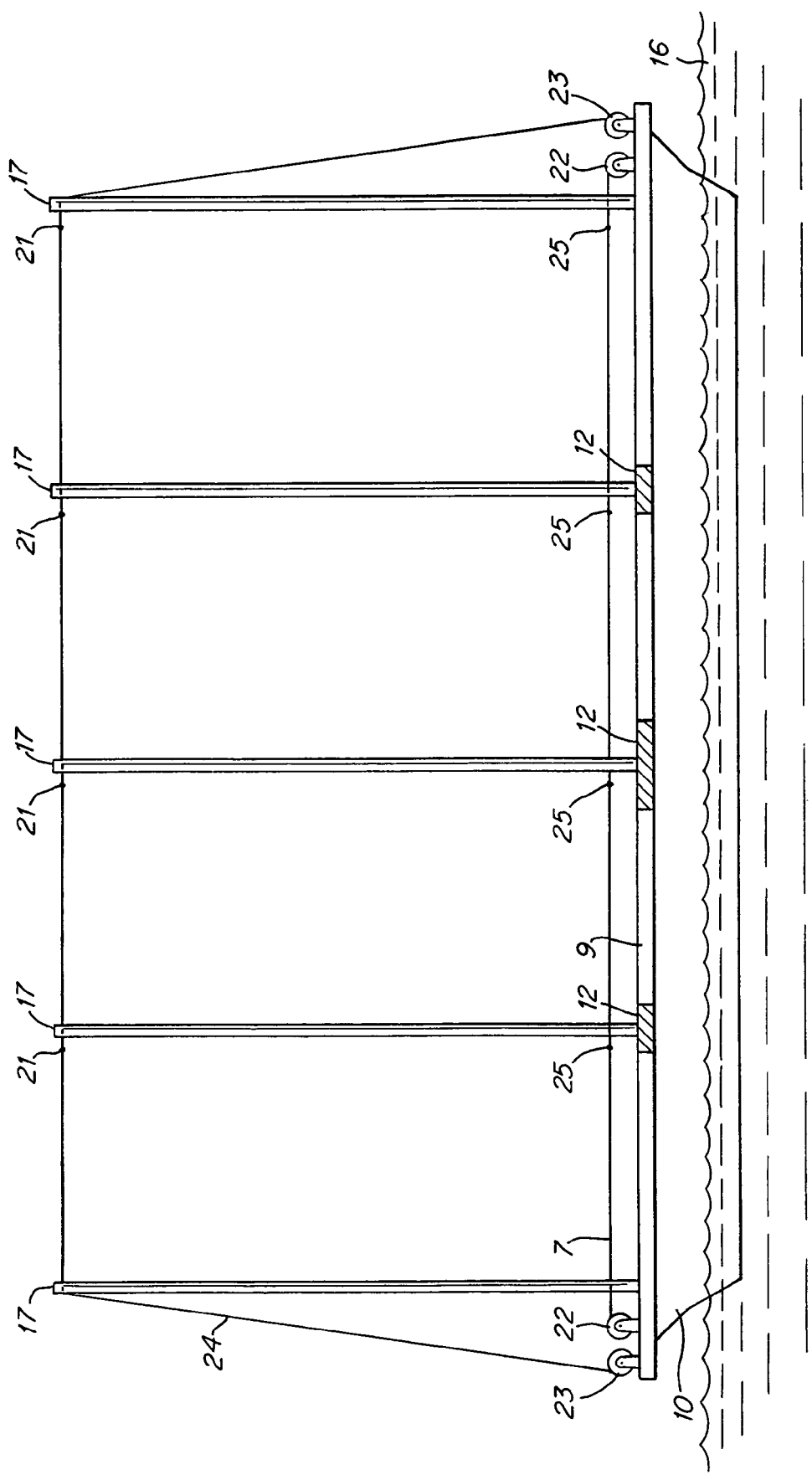
FIG. 4 is a view along line 4—4 in FIG. 3.

When the vessel has reached the end of the linear path in direction 14, the position of the sails 6 is adjusted to the position shown by dotted lines 8 in FIG. 1, so as to move the vessel in a direction 15 opposite to direction 14 and also substantially perpendicular to the wind direction 2. As seen in FIG. 4, to allow the position of the sails 6 to be controlled, the sails 6 are coupled to an upper cable 24 at points 21 and to a lower cable 7 at points 25. The upper and lower cables 24 and 7 are supported by poles 17, which are mounted on supporting element 9 on the secondary floating element 10. Winch pulleys 22 and 23 are provided which respectively correspond to lower cable 7 and upper cable 24 so as to change the position of the lower and upper cables 7 and 24, to thereby change the position of the sails 6.

When the vessel nears the end of its path, the electricity generated by the generator 11 is stored in a battery, in addition to being used to produce hydrogen, in order to use the kinetic energy of the vessel. The vessel also may include fuel cells that may use a portion of the produced hydrogen as a power source, which may be employed to aid in changing the direction of the vessel and changing the positions of the sails. Or, this power may be used to power an emergency motor to move the vessel during a storm.

In this manner, the direction of the vessel is changed without requiring the vessel to turn. It is therefore advantageous for the vessel to be as symmetrical as possible with respect to an axis perpendicular to the linear path defined by directions 14 and 15 (and perpendicular to wind direction 2). For example, as shown in FIG. 2, the vessel includes a second rudder 18a for guiding the vessel when it moves along the linear path in direction 15. In addition, as shown in FIG. 1, for example, the structure of the floating elements is symmetrical with respect to an axis perpendicular to the linear path of movement of the vessel. Moreover, as shown in FIGS. 1 and 2, for example, the turbine 13 and generator 11 are preferably designed and constructed symmetrically with respect to the axis perpendicular to the linear path defined by direction 14 and 15. With this structure, the turbine 13 and generator 11 are operable both when the vessel moves in direction 14 and when the vessel changes direction and moves in direction 15.

The length of the vessel is preferably about 250 meters, while the preferred height of the sails 6 is about 100 meters. The total effective area of the sails is therefore about 25,000 $m^2$. At a wind velocity of 10 m/sec, the volume of air passing through the sails is about 250,000 $m^3$/sec. Since the approximate mass of air is 1.2 $kg/m^3$, the total kinetic energy of the wind passing through the sails is about 15 MW. At an estimated efficiency of 15 percent, therefore, the output of a single vessel according to the present invention is about 2.25 MW.

Figure 5:
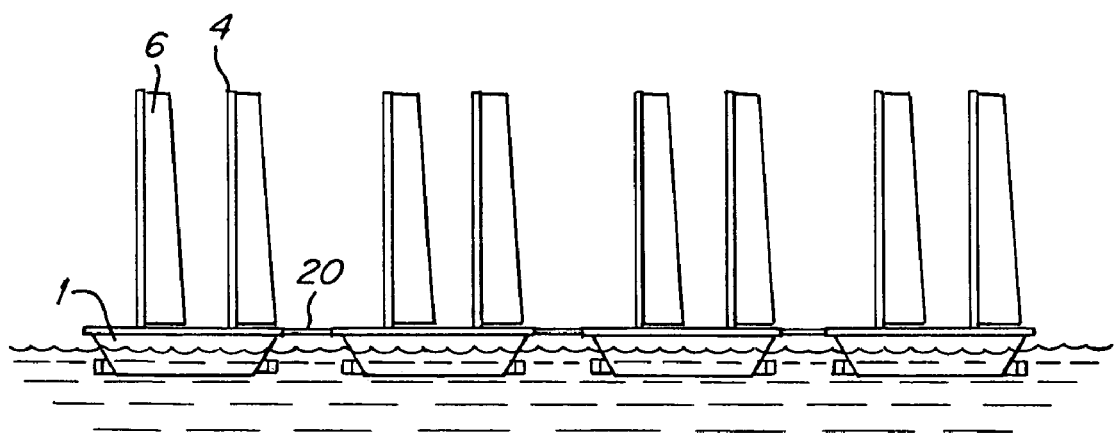
FIG. 5 shows a plurality of vessels connected in series according to the present invention.

Significantly, since the vessel according to the present invention moves along a reciprocal linear path defined by directions 14 and 15, and since turning is unnecessary to change directions, a plurality of vessels are preferably connected in series using connectors 20, as shown in FIG. 5. According to the present invention, about 40 vessels are preferably connected in series, to produce a series of vessels about 10 km long. Therefore, even assuming an idle time of the vessels of 30 percent, the series of 40 vessels according to the present invention may produce about 63 MW.

The efficiency of the system according to the present invention strongly correlates to the ratio of the inefficient drag $D_f$, or the drag of the floating elements, to the efficient drag $D_t$, or the drag of the turbine. This ratio, $D_t/D_f$ is approximately equal to the ratio of the cross-sectional area perpendicular to the linear path of movement of the turbine $A_t$ to the cross-sectional area perpendicular to the linear path of movement of the floating elements $A_f$. That is, $D_t/D_f = A_t/$ Af. Therefore, the efficiency of the system according to the present invention depends on the ratio Dt/(Dt+Df), which is approximately equal to At/(At+Af). Thus, the efficiency of the system increases as the ratio of the area of the turbine At increases with respect to the total area of the turbine and floating elements.

Figure 7A:
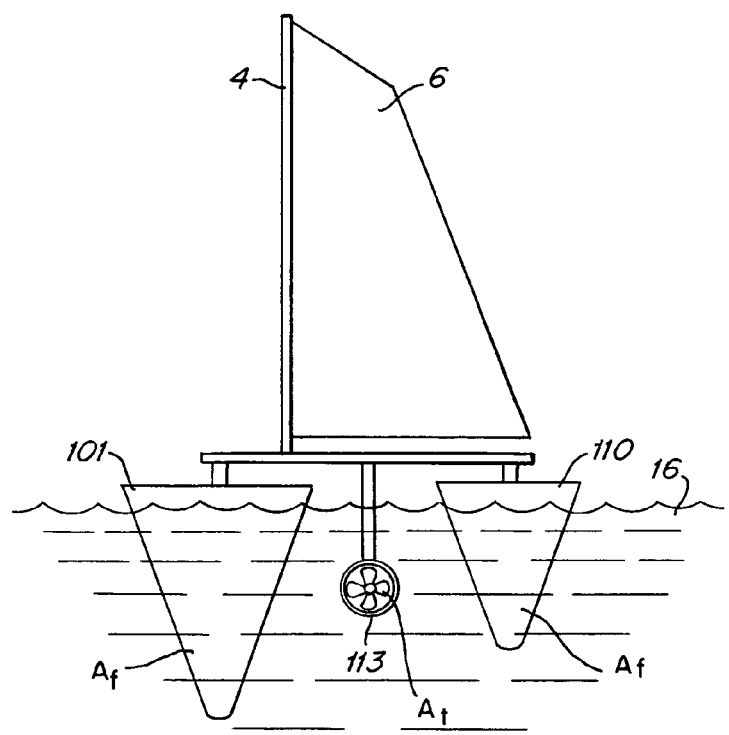
FIG. 7a shows an underwater profile of a conventional vessel with a turbine.
Figure 7B:
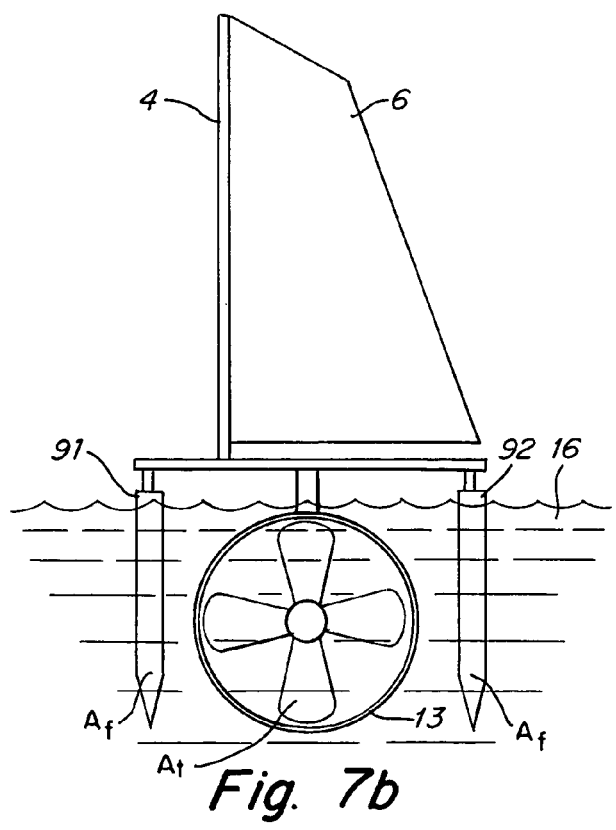
FIG. 7b shows an underwater profile of a vessel according to the present invention.

As shown in FIG. 7a, a conventional vessel with an attached turbine for generating power has floating elements 101 and 110 with an area Af which is considerably larger than an area At of the turbine 113. Thus, the area At of the turbine 113 is less than one half of the total area At+Af of the turbine 113 and the floating elements 101 and 110. Therefore, the efficiency of the power generation system using a conventional vessel is less than 50 percent. According to present invention, however, the area of the floating elements is preferably minimized with respect to the area of the turbine. That is, as shown in FIG. 7b, floating elements 91 and 92 have an area Af which is less than the area At of the turbine 13. Thus, the area At of the turbine 13 is more than one half of the total area At+Af of the turbine 13 and the floating elements 91 and 92. With this structure, the efficiency of the system is greater than 50 percent.

In order to control a series of vessels, each of which must preferably remain on the linear path, each vessel may be provided with a GPS receiver to allow the location of each vessel in the series to be known. The position information is then be transmitted to one of the vessels in the series, for example the first or last vessel in the series, which includes an operation section for controlling the vessels in the series. The operation section collates the position data and transmits instructions to each vessel in the series to, for example, adjust the angle of the sails 6 on the respective vessels so as to control the positions of the respective vessels. The operation section may be run automatically according to a predetermined route and pre-programmed instructions. Alternatively, the operation section may be controlled by a human operator. The operation section may also be provided in a remote operation station, which may be an observation vessel such as a helicopter which observes the condition of the series of vessels. Still further, the operation section may be provided on each of the vessels, so as to allow each vessel to self-correct its position according to a predetermined program.

Figure 8:
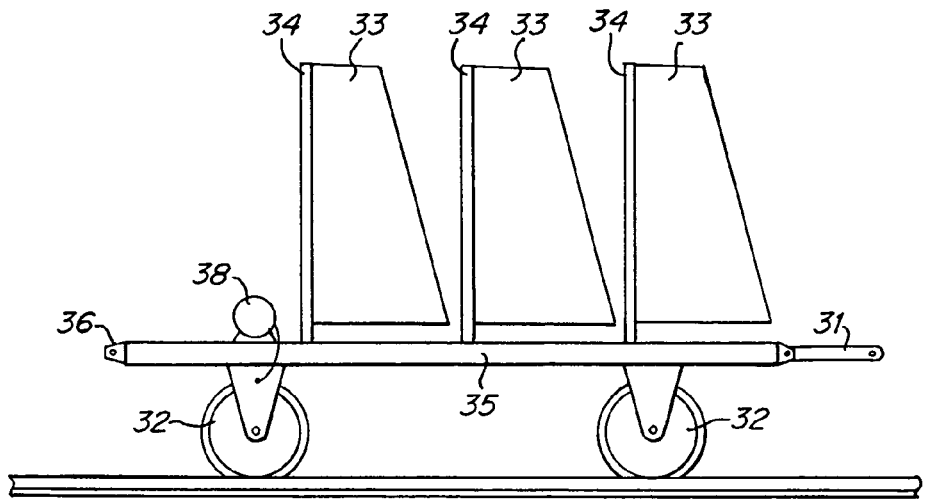
FIG. 8 is a side view of a vehicle according to a second embodiment of the present invention.
Figure 9:
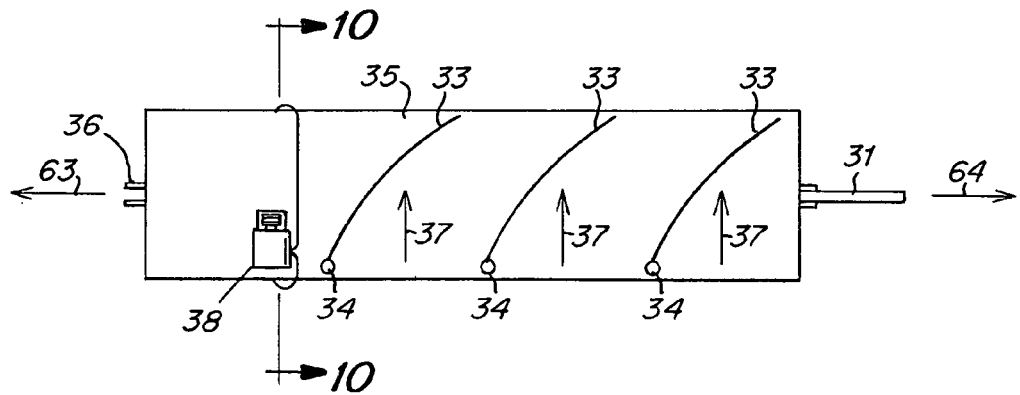
FIG. 9 is an overhead view of the vessel according to the second embodiment of the present invention.

FIGS. 8–11 show a system for generating hydrogen according to a second embodiment of the present invention. The system according to the second embodiment of the present invention is land-based. A platform 35 is provided with a plurality of wheels 32. Preferably, the wheels are electrically conductive, and the platform 35 is provided on an electrically conductive rail system along a substantially linear path. A plurality of sails 33 are mounted on the platform 35 via poles 34. As in the first embodiment, the sails may be made of any flexible or rigid sail material, and the poles may be rigid poles or cables coupled to the platform 35. As shown in FIG. 9, the sails 33 are provided to catch wind moving in direction 37 so as to propel the vehicle in direction 63 on the rail system along a substantially linear path which is substantially perpendicular to the wind direction 37.

Figure 10:
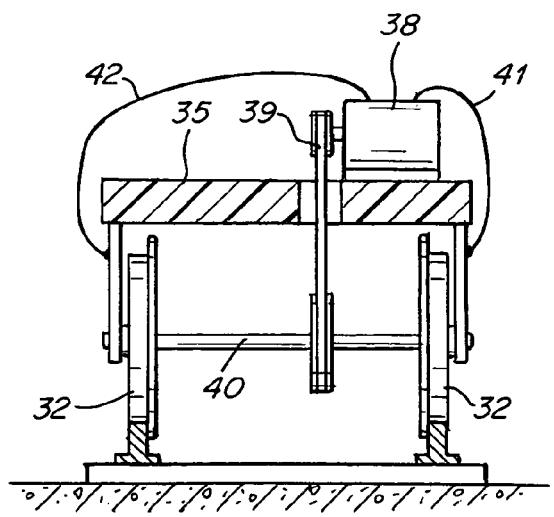
FIG. 10 is a view along line 10—10 in FIG. 9.

As shown in FIG. 10, the movement of the vehicle is converted into electricity via a transmission 39 coupled to the shaft 40 of the wheels 32 and to a generator 38. The transmission 39 transmits the movement of the wheel shaft 40 to the generator 38 to increase the RPM of the generator 38 so as to produce electricity. The transmission 39 may be, for example, a belt or chain which is moved by rotation of the wheel shaft 40 to drive the generator 38. The electricity produced on board of the vehicle is collected by brush type collectors 41 and 42, as shown in FIG. 8. The brush type collectors 41 and 42 transmit the electricity generated by the generator to the rail system through the electrically conductive wheels 32. A transmission 39, generator 38 and brush type collectors 41 and 41 may be provided for each wheel shaft 40 of the platform 35 or may be connected to a part of the wheels of each platform. The electricity that has been transmitted to the electrically conductive rail system is collected and may be used to produce hydrogen in an electrolysis-type hydrogen generator to store the generated electricity in an easily storable and transportable form.

Other methods of collecting the electricity generated by the generator 38 may also be used. For example, the vehicle may be constructed to move along an asphalt path or the like, and may therefore have, for example, rubber wheels. In this situation, as well as in the case of the vehicle moving along the rail system, for example, the electricity may be collected by a system of wires provided along the substantially linear path, through flexible brushes that transmit the electricity to the wires. Moreover, the electricity produced on board the vehicle may be used to produce hydrogen on board the vehicle in an electrolysis type hydrogen generator, which may be supplied with water by, for example, a water tank provided on the vehicle. In addition, the on board hydrogen production system may include a reversible fuel cell which is powered by the electricity generated by the generator.

According to the second embodiment of the present invention, the position of the sails 33 is propel the vehicle along the rail system from direction 63 to direction 64, which is opposite to direction 63 and is also substantially perpendicular to the wind direction 37. The mechanism for changing the position of the sails 33 according to the second embodiment of the present invention is substantially the same as the mechanism for changing the position of the sails 6 according to the first embodiment of the present invention. Description of the mechanism for changing the position of the sails 33 is therefore omitted.

The ends of the rail system along which the vehicle moves preferably slope upward at each end to form slopes 43. The kinetic energy of the movement of the vehicle is thereby converted into potential energy, which aids in slowing and reversing the direction of the vehicle. In addition, a flywheel may be engaged as the vehicle approaches the ends of the path to aid in slowing the vehicle. The rotation of the flywheel may also be used to aid in reversing the direction of the vehicle. Still further, a battery may be provided on the vehicle to store the electricity produced by the generator at the end of the rail system path. The energy stored in the battery may be used to change the position of the sails 33 to propel the vehicle in the new direction.

As in the case of the first embodiment of the present invention, since the vehicle according to the second embodiment of the present invention is designed to move reciprocally in directions 63 and 64, which are opposite to each other, the vehicle is preferably symmetric with respect to an axis which is perpendicular to the substantially linear path (the rail system). The transmission 39 and generator 38 are therefore operable in both direction 63 and direction 64 of movement of the vehicle.

Figure 11:
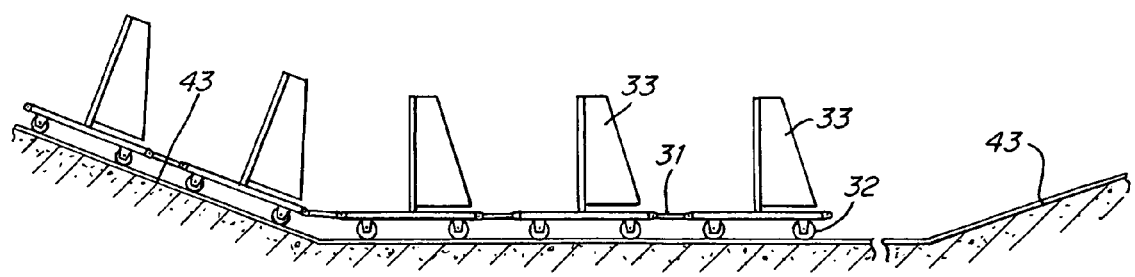
FIG. 11 shows a plurality of vessels connected in series according to the second embodiment of the present invention.

According to the second embodiment of the present invention, the length of each wheeled platform 35 is preferably about 100 meters, and the height of the sails 33 is also preferably about 100 meters. The total area of the sails is therefore about 10,000 m$^2$. Given that the approximate mass of air is 1.2 kg/m$^2$, and assuming a wind speed of about 8 m/sec, then the power of the wind blowing through the sails of the vehicle is about 3.07 MW. As in the manner of the first embodiment of the present invention, according to the second embodiment of the present invention a plurality of vehicles are preferably connected in series, as shown in FIG. 11. As shown in FIG. 8, connectors 31 and 36 are provided on each vehicle to allow the vehicles to be connected in series. That is, the connector 31 shown in FIG. 8 is connected to connector 36 of a preceding vehicle in direction 64, and the connector 36 of the vehicle shown in FIG. 8 is connected to a connector 31 of a following vehicle.

According to the second embodiment of the present invention, therefore, approximately 100 vehicles are connected in series to form a chain of vehicles that is approximately 10 km long. With this construction, the wind power blowing through the sails of a system of 100 vehicles is 307 MW. If the efficiency of the system is assumed to be 30 percent, then the output of the system of about 100 vehicles according to the second embodiment of the present invention is about 93 MW.

Figure 12:
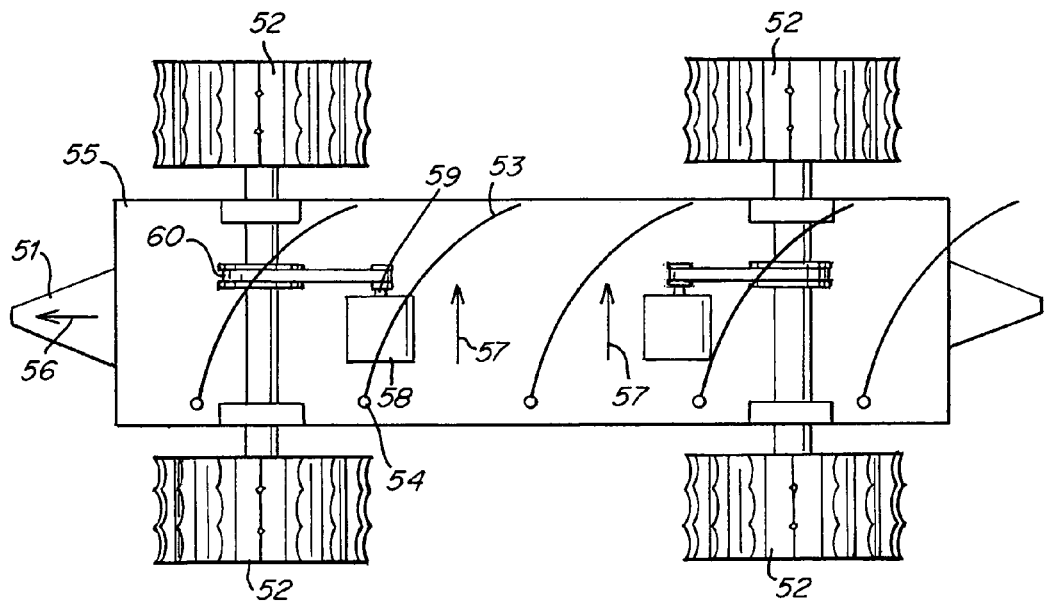
FIG. 12 is an overhead view of a vessel according to a third embodiment of the present invention.
Figure 13:
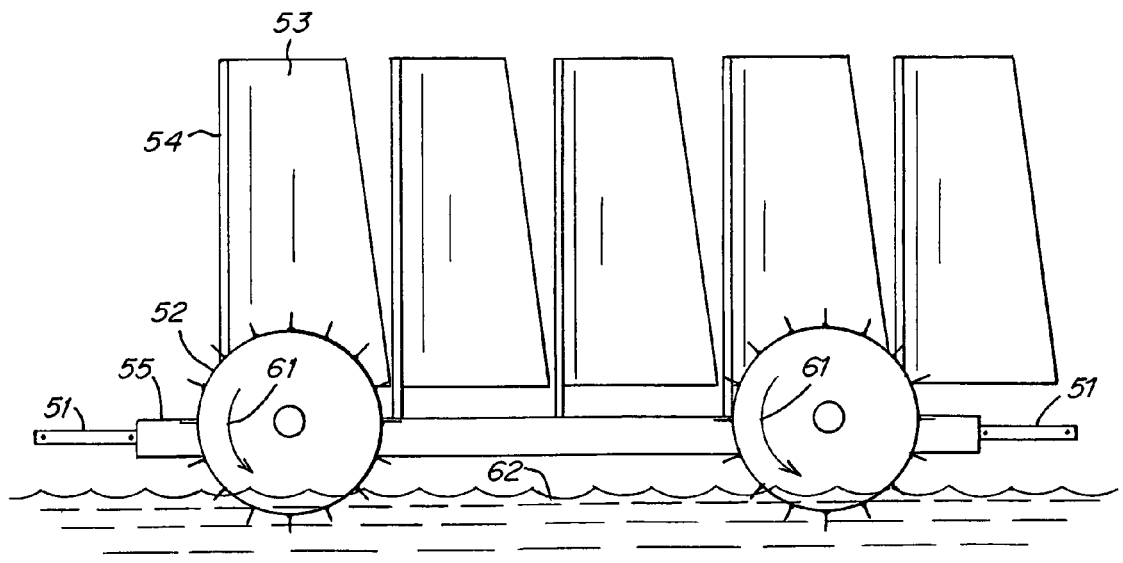
FIG. 13 is a side view of the vessel according to a third embodiment of the present invention.

FIGS. 12 and 13 show a system for generating hydrogen according to a third embodiment of the present invention. A vessel according to the third embodiment of the present invention includes a platform 55 with four large wheels 52 attached thereto. The wheels 52 are buoyant so as to support the platform 55 with all of the components of the vessel mounted thereon above the surface of the water 62. The each wheel 52 is provided with a plurality of fins around an external circumference thereof. A plurality of sails 53 are mounted on the platform 55 via poles 54 to drive the vessel in direction 56, which is substantially perpendicular to wind direction 57. As in the first and second embodiments of the present invention, the sails 53 according to the third embodiment of the present invention may be constructed from any flexible or rigid sail material, and the poles 54 may be, for example, rigid poles or flexible cables coupled to the platform 55.

The movement of the vessel relative to the water 62 causes the wheels 52 to rotate in direction 61. The rotational movement of the wheels 52 is transmitted to a generator 58 via a transmission 60, which transmits the rotational movement of the wheels 52 to a transmission shaft 59, which transmits the movement of the wheels 52 from the transmission 60 to the generator 58. The transmission 59 and 60 may also be, for example, a belt or chain connected to the wheel shaft of the wheels 52, which transfers the rotation of the wheels 52 to the generator 58.

According to the third embodiment of the present invention, the vessel is preferably about 200 meters long, and the sails 53 are preferably 100 meters tall. Assuming that the energy of the wind is about 600 watts per square meter of sail and that the efficiency of the energy production of the vessel is approximately 30 percent, then a single vessel according to the third embodiment of the present invention can produce about 3.6 MW of power. As in the first and second embodiments of the present invention, the vessel according to the third embodiment of the present invention preferably moves reciprocally along a substantially linear path which is perpendicular to the wind direction 37. Therefore, turning of the vessels may be avoided in reversing direction so as to allow a plurality of vessels to be connected in series. According to the third embodiment of the present invention, about fifty vessels are connected in series by connectors 51 to form a series of vessels approximately 10 km long. Thus, a system of about 50 vessels according to the third embodiment of the present invention can produce about 180 MW of total power.

The wheels 52, moreover, preferably have a diameter of 10 meters and a width of 10 meters. Therefore, the volume of a single wheel 52 is approximately 780 m$^3$, and the volume of the four wheels 52 mounted on the platform 55 is approximately 3120 m$^3$. Assuming that the vessel according to the third embodiment of the present invention requires 300,000 kg (300 tons) of floating thrust, then only 10 percent of the volume of the wheels 52 must be submerged to keep the vessel afloat. Significantly, therefore, the underwater profile of the vessel according to the third embodiment is reduced relative to the first and second embodiments, thereby reducing the inefficiency caused by drag.

The remaining systems of the third embodiment of the present invention, such as the mechanisms of hydrogen production and collection and the systems for controlling the movement of the vessel are substantially the same as the corresponding systems of the first embodiment. Description thereof is therefore omitted.

Additional advantages and modifications will readily occur to those skilled in the art. For example, the features of any of the embodiments may be used singly or in combination with any other of the embodiments of the present invention. Accordingly, various modifications may be made without departing from the spirit or scope of the general inventive concept as defined by the appended claims and their equivalents.

What is claimed is:

1. A system for producing hydrogen, comprising:
    (i) a plurality of sail-driven vessels floating in water and coupled to each other in a predetermined spaced apart configuration to form a convoy, each said vessel comprising:
        at least one sail for capturing wind to move the vessel reciprocally substantially along a predetermined path;
        at least one turbine provided below each said vessel so as to be submerged in the water and rotated by water flowing therethrough when the floating vessels are moved relative to the water by the at least one sail;
        a generator adapted for converting rotation of the at least one turbine into electricity;
        an onboard hydrogen production system to produce hydrogen using the electricity generated by the generator; and
        at least on inflatable hydrogen storage container which is arranged to be inflated with produced hydrogen, and which is detachably and replaceably connected to the vessel so as to be removable while the plurality of vessels are in motion;
    (ii) a position determining system including a global position system (GPS) receiver provided on at least one of the vessels and communicating with the other vessels to determine relative position of each said vessel; and
    (iii) a control system adapted to control the position of each said vessel in response to information received form the position determining system;
        wherein each said system is substantially symmetrical with respect to an axis which is substantially perpendicular to the predetermined path;
        wherein the vessels in the convoy are adapted to move together in both forward and backward directions while coupled together, and the turbine and generator on each of the vessels are operable both while the vessels move forward and while the vessels move backward;

wherein the control system maintains the moving vessels in the predetermined spaced apart configuration in the forward and backward directions substantially along the predetermined path; and wherein at least one of the vessels is unmanned.

2. The system for producing hydrogen according to claim 1, wherein the at least one sail is rigid.

3. The system for producing hydrogen according to claim 1, wherein the predetermined path is substantially linear.

* * * * *